(12) United States Patent
Ginzburg

(10) Patent No.: US 7,522,571 B2
(45) Date of Patent: Apr. 21, 2009

(54) TECHNIQUES TO ENABLE DIRECT LINK DISCOVERY IN A WIRELESS LOCAL AREA NETWORK

(75) Inventor: Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 528 days.

(21) Appl. No.: 11/354,507

(22) Filed: Feb. 14, 2006

(65) Prior Publication Data

US 2007/0201410 A1    Aug. 30, 2007

(51) Int. Cl.
*H04Q 7/20* (2006.01)
(52) U.S. Cl. .................. 370/338; 370/328; 370/310; 370/346; 455/507; 455/517
(58) Field of Classification Search ................ 370/310, 370/310.2, 328, 338, 349, 346, 449, 471; 455/422.1, 597, 512, 517, 524–525, 575.7, 455/550.1, 518–520, 507
See application file for complete search history.

(56) References Cited

U.S. PATENT DOCUMENTS

| | | | |
|---|---|---|---|
| 2004/0264394 | A1 | 12/2004 | Ginzburg et al. |
| 2004/0264396 | A1 | 12/2004 | Ginzburg et al. |
| 2004/0264413 | A1 | 12/2004 | Kaidar et al. |
| 2004/0264423 | A1 | 12/2004 | Ginzburg et al. |
| 2005/0041616 | A1 | 2/2005 | Ginzburg et al. |
| 2005/0047361 | A1 | 3/2005 | Fudim et al. |
| 2005/0053037 | A1 | 3/2005 | Ginzburg et al. |
| 2005/0064817 | A1 | 3/2005 | Ginzburg |
| 2005/0070279 | A1 | 3/2005 | Ginzburg et al. |
| 2005/0108527 | A1* | 5/2005 | Ginzburg et al. ............ 713/168 |
| 2005/0111416 | A1 | 5/2005 | Ginzburg |
| 2005/0122989 | A1 | 6/2005 | Ginzburg et al. |
| 2005/0129068 | A1 | 6/2005 | Ginzburg et al. |
| 2005/0135304 | A1* | 6/2005 | Wentink et al. ............. 370/329 |
| 2005/0135305 | A1* | 6/2005 | Wentink ..................... 370/329 |
| 2005/0135459 | A1 | 6/2005 | Ginzburg et al. |
| 2005/0213554 | A1 | 9/2005 | Ginzburg et al. |
| 2005/0213601 | A1 | 9/2005 | Ginzburg et al. |
| 2005/0215197 | A1 | 9/2005 | Chen et al. |
| 2005/0220131 | A1 | 10/2005 | Ginzburg et al. |
| 2005/0220198 | A1 | 10/2005 | Trainin et al. |
| 2005/0227661 | A1 | 10/2005 | Ginzburg |
| 2005/0266803 | A1 | 12/2005 | Dinur et al. |

(Continued)

FOREIGN PATENT DOCUMENTS

WO        01/15387 A1      3/2001

OTHER PUBLICATIONS

U.S. Appl. No. 11/022,873; Title: Method and Apparatus to Provide Quality of Service to Wireless Local Area Networks; Inventor: Boris Ginzburg; filed Dec. 28, 2004.

(Continued)

*Primary Examiner*—Kamran Afshar
(74) *Attorney, Agent, or Firm*—James S. Finn; Intel Corporation

(57) ABSTRACT

An embodiment of the present invention provides an apparatus, comprising a wireless station operable in a wireless local area network, the wireless station capable of automatic discovery of other stations in a basic service set (BSS) which are capable of supporting direct link setup (DLS).

17 Claims, 3 Drawing Sheets

U.S. PATENT DOCUMENTS

| | | | |
|---|---|---|---|
| 2006/0018477 | A1 | 1/2006 | Jalfon et al. |
| 2006/0062235 | A1 | 3/2006 | Ginzburg |
| 2006/0072493 | A1 | 4/2006 | Ginzburg et al. |
| 2006/0189359 | A1* | 8/2006 | Kammer et al. ............. 455/574 |

OTHER PUBLICATIONS

U.S. Appl. No. 10/989,409; Title: Method and Apparatus of Scanning Control Signal; Inventor: Boris Ginzburg; filed Nov. 17, 2004.

U.S. Appl. No. 10/994,330; Title: Apparatus and Method of Aggregation of Data Packets Streams; Inventor: Boris Ginzburg; filed Nov. 23, 2004.

U.S. Appl. No. 11/028,540; Title: Device, System and Method of Selective Aggregation of Transmission Streams; Inventor: Boris Ginzburg; filed Jan. 5, 2005.

U.S. Appl. No. 11/024,754; Title: Device, System and Method for Limiting Data Rates Supported by a Wireless LAN; Inventor: Boris Ginzburg; filed Dec. 30, 2004.

U.S. Appl. No. 11/093,437; Title: Method and Apparatus for Adaptive Network Allocation; Inventor: Yuval Bachrach et al.; filed Mar. 29, 2005.

U.S. Appl. No. 11/074,987; Title: Method and Apparatus for Implementing Block Acknowledgement in a Wireless Network; Inventor: Boris Ginzburg; filed Mar. 8, 2005.

U.S. Appl. No. 11/278,362; Title: Method for Aggregation of a Number of Media Access Control (MAC) Frames into a Single Phyical Layer Frame in a Distributed MAC Layer; Inventor: Boris Ginzburg; filed Mar. 31, 2006.

U.S. Appl. No. 11/046,825; Title: Apparatus and Method of Controlling Transmission of Response Frame; Inventor: Boris Ginzburg; filed Feb. 1, 2005.

U.S. Appl. No. 11/167,007; Title: System and Method for Admission Control of Multicast Downstream Traffic in a Wireless Network; Inventor: Boris Ginzburg; filed Jun. 24, 2005.

U.S. Appl. No. 11/169,366; Title: A Compact Medium Access Control (MAC) Layer; Inventor: Boris Ginzburg; filed Jun. 28, 2005.

U.S. Appl. No. 11/118,225; Title: Adaptive Control Physical Carrier Sense Parameters in Wireless Networks; Inventor: Xingang Guo et al.; filed Apr. 28, 2005.

U.S. Appl. No. 11/091,581; Title: Device, System and Method of Establishing a Wireless Communication Link; Inventor: Boris Ginzburg; filed Mar. 29, 2005.

U.S. Appl. No. 11/169,510; Title: Multiple Media Access Control Apparatus and Methods; Inventor: Boris Ginzburg; filed Jun. 29, 2005.

U.S. Appl. No. 11/238,146; Title: Device, System and Method of Coordination Among Wireless Transceivers; Inventor: Boris Ginzburg; filed Sep. 29, 2005.

U.S. Appl. No. 11/212,581; Title: Method and Apparatus of Multiple Entity Wireless Communication Adapter; Inventor: Amit Barak et al.; filed Aug. 29, 2005.

U.S. Appl. No. 11/392,826; Title: Device, System, and Method of Selectively Scanning a Wireless Communication Band; Inventor: Boris Ginzburg; filed Mar. 30, 2006.

U.S. Appl. No. 11/263,778; Title: Methods and Apparatus for Providing a Platform Coexistence System of Multiple Wireless Communication Devices; Inventor: Camille Chen et al.; filed Oct. 31, 2005.

U.S. Appl. No. 11/354,507; Title: Techniques to Enable Direct Link Discovery in a Wireless Local Area Network; Inventor: Boris Ginzburg; filed Feb. 14, 2006.

U.S. Appl. No. 11/393,090; Title: Voice Signaling Traffic Apparatus, Systems, and Methods; Inventor: Ayelet Alon et al.; filed Mar. 30, 2006.

U.S. Appl. No. 11/393,084; Title: Learning Mechanism to Configure Power Save Parameters for Automatic Power Save Delivery; Inventor: Ayelet Alon; filed Mar. 30, 2006.

U.S. Appl. No. 11/094,289; Title: Device, System and Method for Coordinating Power Saving with Access Categories; Inventor: Ayelet Alon et al.; filed Mar. 31, 2005.

U.S. Appl. No. 11/239,163; Title: Method and Apparatus of Multi-Entity Wireless Communication Adapter; Inventor: Amit Barak et al.; filed Sep. 30, 2005.

U.S. Appl. No. 11/236,575; Title: System, Method and Apparatus of Protecting a Wireless Transmission; Inventor: Boris Ginzburg et al.; filed Sep. 28, 2005.

Björn H. Gerth; Service Discovery in Home Envirnments; Seminararbeit (Wintersemester 2002/2003).

International Search Report/Written Opinion for PCT Patent Application No. PCT/US2007/004401, Mailed Jul. 4, 2007, 9 Pages.

* cited by examiner

TECHNIQUES TO ENABLE DIRECT LINK DISCOVERY IN A WIRELESS LOCAL AREA NETWORK

BACKGROUND

Wireless communications, including wireless networks, have become pervasive throughout society. Improvements in wireless communications are vital to increase their reliability and speed. Direct link setup (DLS) may be provided for in wireless standards to facilitate wireless communication. One problem in direct link setup (DLS) is how a station can discover that there are other stations in a basic service set (BSS) that are capable supporting DLS.

Thus, a strong need exists for automatic DLS discovery in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
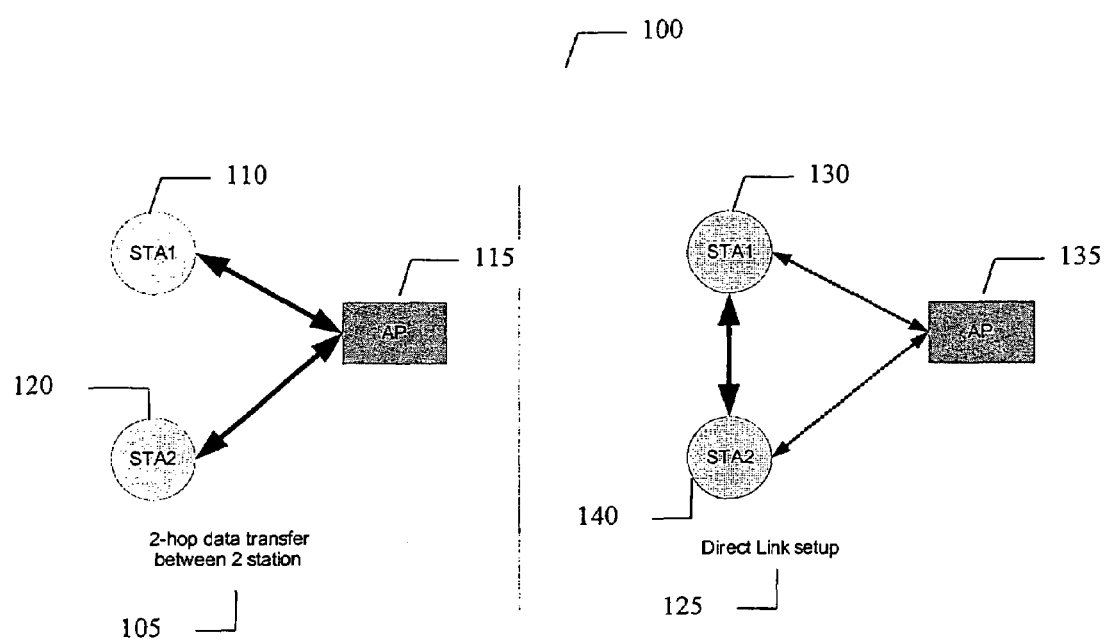
FIG. 1 illustrates a two hop transfer between two stations and a direct link setup of an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

An algorithm, technique or process is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause and effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like), wireless wide are networks (WWAN) and Mesh networks.

An embodiment of the present invention provides Direct Link Setup (DLS) discovery in 802.11 WLAN, which may be based on an extension of the Institute for Electronic and Electrical Engineers 802.11e protocol. However, it is understood that the present invention is not limited to any particular standard or any particular wireless communications.

The 802.11e standard provides the capability that when two stations are in a basic service set (BSS), they can directly exchange data between each other. It is understood that the present invention is not limited to two stations and it is used herein for illustrative purposes only.

As stated above, one of the main problems in DLS is how a station can discover that there are other stations in a BSS capable of supporting DLS. The current state of the art is for a manual setup to be used.

An embodiment of the present invention provides extending the 801.11e protocol by adding proprietary frames for automatic DLS discovery and using a "centralized" access point (AP). A Client which is DLS capable may add a new proprietary IE Information Element (IE) that may be referred to as "DLS capability" to the association/re-association request. The AP may keep the "DLS capability" information on each member of its BSS.

For a Station that would like to know if there are other stations capable of supporting DLS, the Station may send a new management frame, called "DLS list request" to an AP to which it is associated. The AP may respond to a "DLS list request" frame with a "DLS list response" frame. This frame may contain the list of all DLS capable BSS members and in an embodiment of the present invention may also include following information for each station:
  a. Encryption cipher
  b. Supported rate set
  c. Current transmit (from AP to STA) and receive (from STA to AP) data rate
    In an embodiment of the present invention, one station may be allowed to send a NULL data frame (essentially this is "DLS probe") from one DLS capable station to another DLS capable station prior to DLS establishment. This feature may be used by DLS station to estimate the possible DLS data rate with other station.

Turning now to the figures, FIG. 1, generally at 100, illustrates a two hop transfer between two stations 105 and a direct link setup 125 of an embodiment of the present invention. During the communication between two stations with a two hop transfer, to set up communication between station one 110 and station two 120, a two hop transfer must be used. However, in an embodiment of the present invention, in the direction link setup (DLS) 125 of the present invention, communication may be directly set up between station one 130 and station two 140 without needing a two hop transfer using access point (AP) 135.

Figure 2:
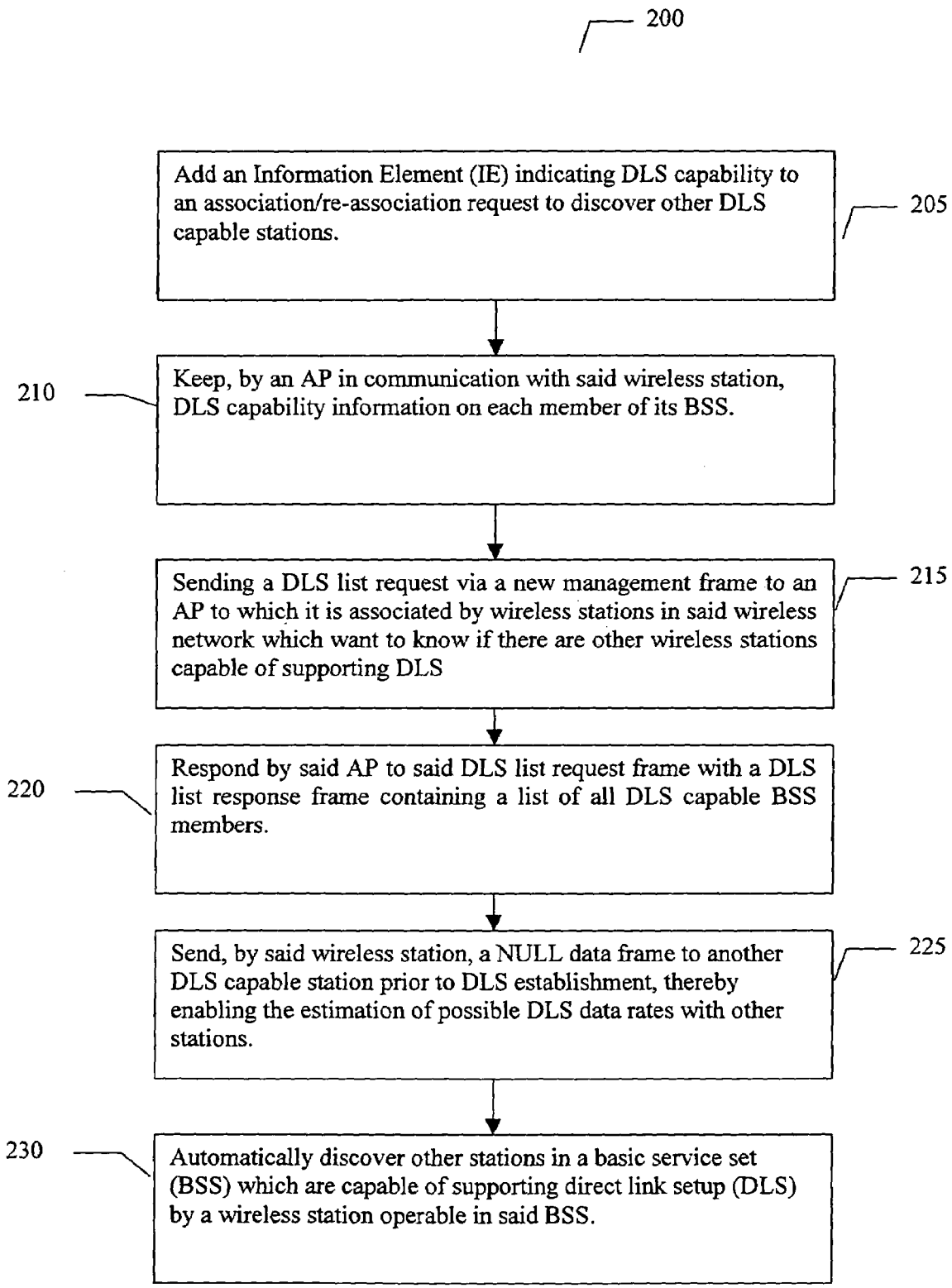
FIG. 2 illustrates a method of direct link setup of an embodiment of the present invention.

Turning now to FIG. 2 at 200 is a method of direct link setup of an embodiment of the present invention that provides at 230 automatically discovering other stations in a basic service set (BSS) which are capable of supporting direct link setup (DLS) by a wireless station operable in the BSS. The method may further comprise adding an Information Element (IE) indicating DLS capability to an association/re-association request to discover other DLS capable stations 205 and keeping, by an AP in communication with the wireless station, DLS capability information on each member of its BSS 210. Further, an embodiment of the present invention provides sending a DLS list request via a new management frame to an AP to which it is associated by wireless stations in the wireless network which want to know if there are other wireless stations capable of supporting DLS 215 and responding by the AP to the DLS list request frame with a DLS list response frame containing a list of all DLS capable BSS members 220.

The list of all DLS capable BSS members may include for each station: encryption cipher; supported rate set; and current transmit and receive data rate. In an embodiment of the present invention the present invention may further provide sending, by the wireless station, a NULL data frame to another DLS capable station prior to DLS establishment, thereby enabling the estimation of possible DLS data rates with other stations 225.

Figure 3:
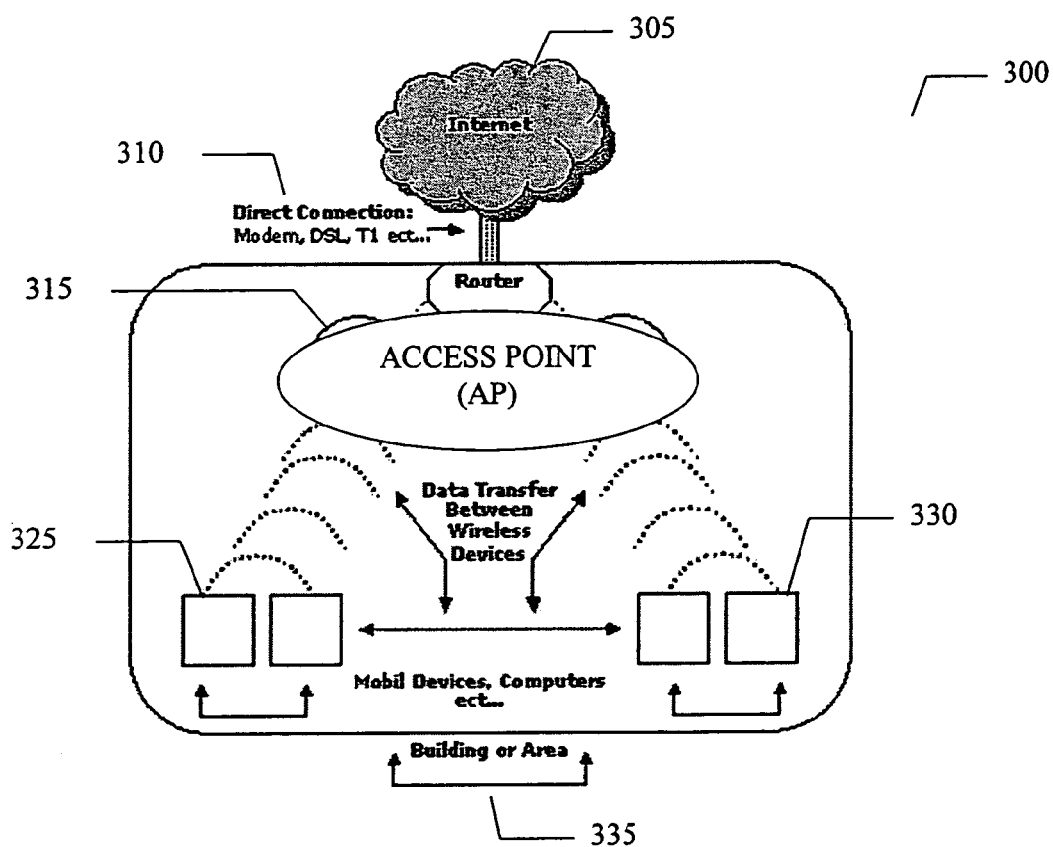
FIG. 3 depicts a system that may use direct link setup of one embodiment of the present invention.

FIG. 3 at 300 depicts a system that may use direct link setup of one embodiment of the present invention. In an embodiment of the present invention the present system may comprise a first wireless station 325 including a dipole antenna (not shown) enabling operation in a wireless local area network (WLAN) 335; at least one additional wireless station 330 operable in a basic service set (BSS) with the first wireless station 325; and wherein the first wireless station 325 may be capable of automatically discovering if the at least one additional wireless station 330 is capable of supporting direct link setup (DLS). Wireless stations 325 and 330 may be in communication with access point (AP) 315, which may be connected to router which may further be connected to the Internet 305 via modem, DSL, Cable, T1 etc. 310.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus, comprising:
  a wireless station operable in a wireless local area network, said wireless station capable of automatic discovery of other stations in a basic service set (BSS) which are capable of supporting direct link setup (DLS), wherein said discovery of other stations is enabled by DLS capable stations adding an Information Element (IE) indicating DLS capability to an association/re-association request and wherein an AP keeps DLS capability information on each member of its BSS and further wherein wireless stations in said wireless network which want to know if there are other wireless stations capable of supporting DLS, send a DLS list request via a new management frame to an AP to which it is associated.

2. The apparatus of claim 1, wherein wireless stations in said wireless network which want to know if there are other wireless stations capable of supporting DLS, sends a DLS list request via a new management frame to an AP to which it is associated.

3. The apparatus of claim 2, wherein said AP responds to said DLS list request frame with a DLS list response frame containing a list of all DLS capable BSS members.

4. The apparatus of claim 3, wherein said list of all DLS capable BSS members includes for each station: encryption cipher; supported rate set; and current transmit and receive data rate.

5. The apparatus of claim 4, wherein said wireless station is capable of sending a NULL data frame to another DLS capable station prior to DLS establishment, thereby enabling the estimation of possible DLS data rates with other stations.

6. A method, comprising:
  automatically discovering other stations in a basic service set (BSS) which are capable of supporting direct link setup (DLS) by a wireless station operable in said BSS, wherein said discovery of other stations is enabled by DLS capable stations adding an Information Element (IE) indicating DLS capability to an association/re-association request and wherein an AP keeps DLS capability information on each member of its BSS and further wherein wireless stations in said wireless network which want to know if there are other wireless stations capable of supporting DLS, send a DLS list request via a new management frame to an AP to which it is associated.

7. The method of claim 6, further comprising sending a DLS list request via a new management frame to an AP to which it is associated by wireless stations in said wireless network which want to know if there are other wireless stations capable of supporting DLS.

8. The method of claim 7, further comprising responding by said AP to said DLS list request frame with a DLS list response frame containing a list of all DLS capable BSS members.

9. The method of claim 8, wherein said list of all DLS capable BSS members includes for each station: encryption cipher; supported rate set; and current transmit and receive data rate.

10. The method of claim 9, further comprising sending, by said wireless station, a NULL data frame to another DLS capable station prior to DLS establishment, thereby enabling the estimation of possible DLS data rates with other stations.

11. A computer readable medium encoded with a computer program, that provides instructions, which when accessed, cause a machine to perform operations comprising:
   automatically discovering other stations in a basic service set (BSS) which are capable of supporting direct link setup (DLS) by a wireless station operable in said BSS, wherein said discovery of other stations is enabled by DLS capable stations adding an Information Element (IE) indicating DLS capability to an association/re-association request and wherein an AP keeps DLS capability information on each member of its BSS and further wherein wireless stations in said wireless network which want to know if there are other wireless stations capable of supporting DLS, send a DLS list request via a new management frame to an AP to which it is associated.

12. The computer readable medium encoded with a computer program of claim 11, further comprising said instructions causing said machine to perform operations further comprising sending a DLS list request via a new management frame to an AP to which it is associated by wireless stations in said wireless network which want to know if there are other wireless stations capable of supporting DLS.

13. The computer readable medium encoded with a computer program of claim 11, further comprising said instructions causing said machine to perform operations further comprising responding by said AP to said DLS list request frame with a DLS list response frame containing a list of all DLS capable BSS members.

14. A system, comprising:
   a first wireless station including a dipole antenna enabling operation in a wireless local area network (WLAN);
   at least one additional wireless station operable in a basic service set (BSS) with said first wireless station;
   wherein said first wireless station is capable of automatically discovering if said at least one additional wireless station is capable of supporting direct link setup (DLS); and
   wherein said discovery of other stations is enabled by DLS capable stations adding an Information Element (IE) indicating DLS capability to an association/re-association request and wherein an AP keeps DLS capability information on each member of its BSS and further wherein wireless stations in said wireless network which want to know if there are other wireless stations capable of supporting DLS, send a DLS list request via a new management frame to an AP to which it is associated.

15. The system of claim 14, wherein wireless stations in said wireless network which want to know if there are other wireless stations capable of supporting DLS, sends a DLS list request via a new management frame to an AP to which it is associated.

16. The system of claim 15, wherein said AP responds to said DLS list request frame with a DLS list response frame containing a list of all DLS capable BSS members.

17. The system of claim 16, wherein said list of all DLS capable BSS members includes for each station: encryption cipher; supported rate set; and current transmit and receive data rate.

* * * * *